United States Patent

[11] 3,552,299

[72] Inventor: Martin A. Patoka
Oak Park, Ill.
[21] Appl. No.: 821,623
[22] Filed: May 5, 1969
[45] Patented: Jan. 5, 1971
[73] Assignee: Tru-Broil Corporation
Oak Park, Ill.
a corporation of Illinois

[54] ROTARY OVEN
10 Claims, 4 Drawing Figs.

[52] U.S. Cl. ............................................. 99/339,
99/391, 99/393, 99/400, 99/443, 99/446, 99/448,
126/41
[51] Int. Cl. ............................................. A47j 37/04
[50] Field of Search ............................................. 126/41;
99/339, 385, 389, 391, 393, 400, 423, 427, 425,
443, 446, 448

[56] References Cited
UNITED STATES PATENTS

| | | | |
|---|---|---|---|
| 1,543,212 | 6/1925 | Kurrell et al. | 99/443UX |
| 2,372,362 | 3/1945 | Dawson | 126/41 |
| 2,419,261 | 4/1947 | Groetchen | 99/423 |
| 2,438,699 | 3/1948 | Groetchen | 99/423 |
| 2,542,265 | 2/1951 | Staples | 99/339X |
| 3,362,320 | 1/1968 | Marasco | 99/443 |

Primary Examiner—Billy J. Wilhite
Attorney—Gary, Parker, Juettner, Pigott & Cullinan ABSTRACT: Improvements in rotary oven of the general character disclosed in U.S. Pat. Nos. 2,372,362 and 2,419,261; i.e., a cylindrical oven enclosing a plurality of rotary cooking shelves, burners above some of the shelves whereby those below the burners may be used for broiling and those above the burners may be used for baking, a door accommodating access to the bake shelves, horizontally elongate door means for each broiler shelf accommodating placing of food thereon for such selective arc of rotation as to cause the same to be cooked "well done," "medium" or "rare," and discharge means for each broil deck spaced circumferentially from the respective door means for automatically discharging the food after its preselected arc of rotary movement in the oven; the improvements including structural refinements, a new vertically adjustable bake shelf, a water heating coil providing more complete utilization of available heat, a new crumb or waste collector and tray, more efficient and effective burners and improved speed control means for the cooking shelves.

PATENTED JAN 5 1971

Inventor:
Martin A. Patoka
By Gary Parker,
Juettner, Pigott & Cullinan Atty's

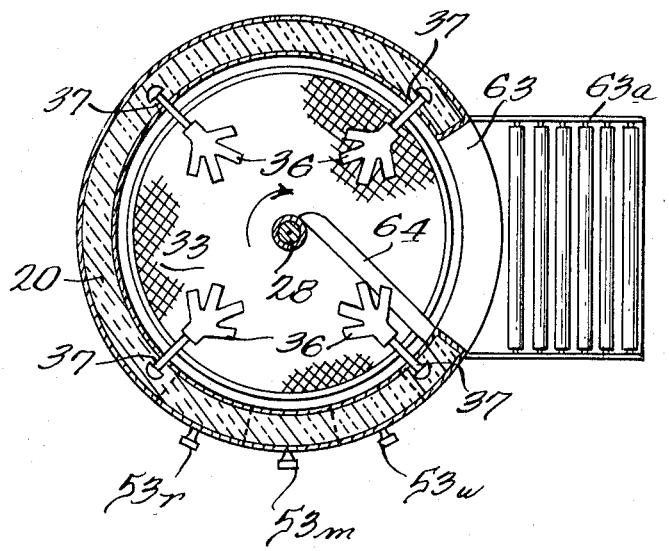
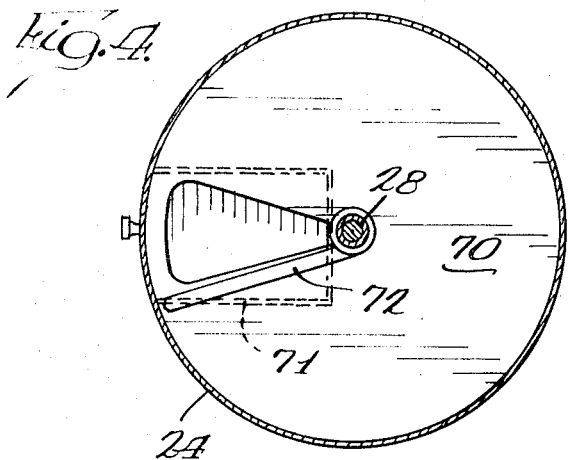

ROTARY OVEN

Other features and advantages of the improved rotary oven will become apparent from the drawings and the following description which are given for the purpose of acquainting those skilled in the art with the best mode presently contemplated by me for carrying out my invention.

THE DRAWINGS

FIG. 3 is a cross-sectional view taken substantially on line 3—3 of FIG. 2 showing the improved burners of the oven; and FIG. 4 is a cross-sectional view taken substantially on line 4—4 of FIG. 2 showing the new crumb collector and tray.

DESCRIPTION

Figure 1:
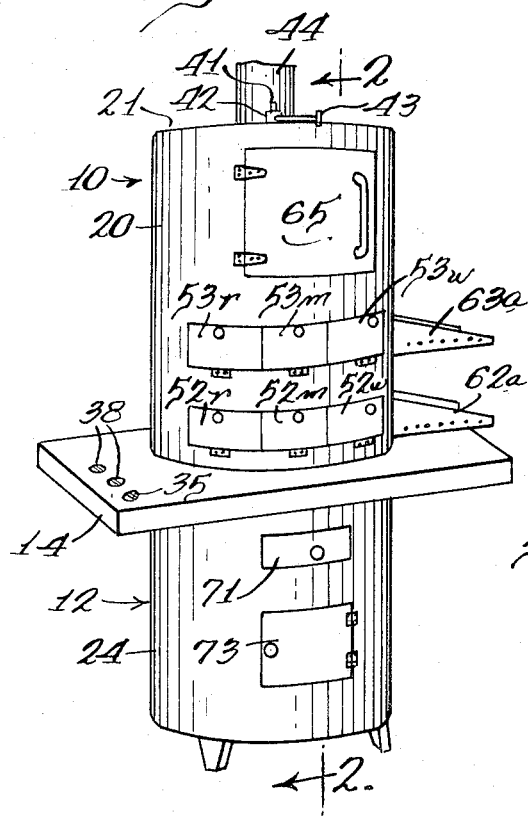
FIG. 1 is a perspective view of the preferred embodiment of my improved rotary oven.

The oven is comprise of a cylindrical insulated enclosure 10 constituting the oven per se, a base 12 supporting said enclosure 10 at approximately waist height for ready access without requiring the operator to either stoop or stretch, and a convenience table 14 for the operator.

The enclosure 10, except for certain openings, comprises essentially an inverted cup having a vertical cylindrical wall 20 and a circular top wall 21. Each wall is comprised of spaced parallel inner and outer sheets of stainless steel and interposed insulating material affording high degrees of both insulation and sanitation.

The enclosure is downwardly open and rests upon suitable structural frame members 23 comprising part of the base 12. For aesthetic and sanitary purposes, the frame is preferably enclosed by a cylindrical sheet or skirt 24 of stainless steel.

Mounted within the base is a supporting deck or crossframe 25 which mounts an electric gear motor 26 and a bearing structure 27 for rotatably supporting and driving a vertical shaft 28. Preferably, the frame 25 is located somewhat above the bottom of the base to protect the motor and bearing from contamination, and also to facilitate cleaning under the oven. A second supporting and guiding bearing 29 for the shaft is supported by crossframing provided at the top of and comprising part of the base 10.

The bearings 27 and 29 support the shaft 28 coaxially of the base and oven, and the upper end of the shaft extends freely into the enclosure 10 wherein it is provided with a plurality of vertically spaced shelf supporting drive collars 31. Each collar supports and has frictional driving engagement with a circular cooking shelf or deck, the frictional engagement usually causing the shaft to rotate the shelves but accommodating relative movement between each shelf and the shaft should something become stuck or jammed in the oven or should the chef wish to exert manual control over shelf rotation or placement. In the preferred embodiment of the oven, there are three of the collars 31 and three of the cooking shelves or decks, namely, from the bottom up, a pair of vertically spaced broiling decks 32 and 33 and a further upwardly spaced baking deck 34.

Figure 2:
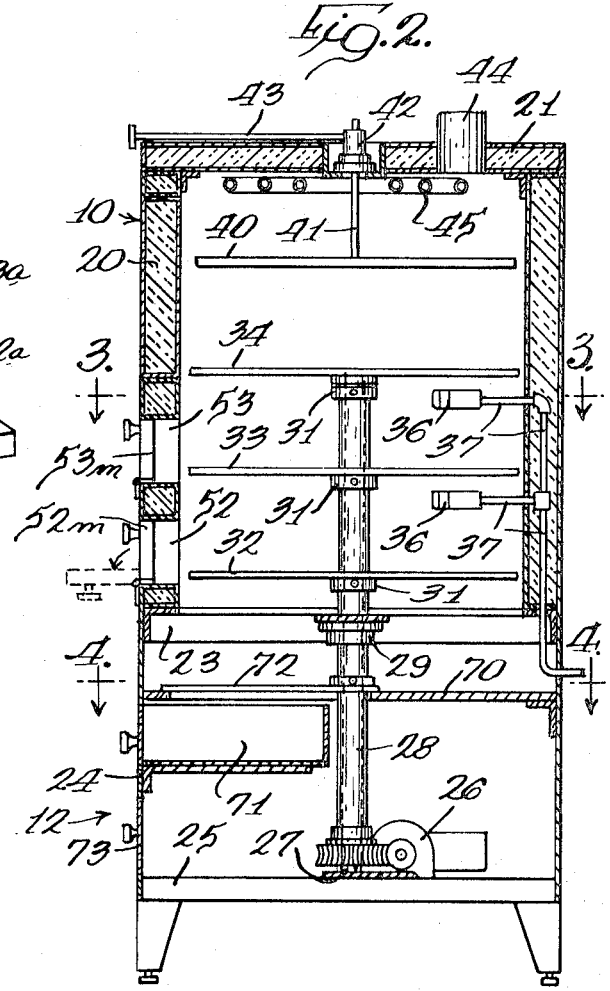
FIG. 2 is an enlarged vertical section thereof taken substantially on line 2—2 of FIG. 1.

The motor 26 is preferably a variable speed gear motor directly coupled to the shaft 28, as illustrated in FIG. 2. A motor controller, including a manually adjustable speed control knob 35 located on the table 14, is provided for permitting variation in the speed of rotation of the shelves 32, 33 and 34, for purposes to be described.

Within the enclosure 10, above each of the broil decks 32 and 33, are a plurality of infrared burners 36. The burners may be gas or electric, but are preferably gas fired. Each set of burners preferably comprises four burners mounted at equal circumferential spacings as shown in FIG. 3. Each burner may be appropriately mounted on a supply pipe 37 extending from and through the insulated space between the enclosure walls. Customary manual controls 38 for the burners are provided on the table 14. Each set of burners 36 is mounted for facilitating broiling on the respective one of the decks 32 and 33 therebelow, and the heat from these burners rises within the enclosure to constitute the upper part of the enclosure a baking oven; the shelf or deck 34 being located within such baking space.

Spaced vertically above the deck 34 is a second baking deck or shelf 40. This deck is suspended from the ceiling or top wall 21 of the oven by means of a central shaft or rod 41 which is slidably and rotatably supported in a bearing assembly 42 provided at the center of the top wall. An elongate setscrew 43 extends from the bearing assembly to the front of the oven above the top wall 21 to accommodate locking the shaft or rod 41 in vertically adjusted position in the bearing. Such adjustment accommodates variation in the spacing between the shelves 34 and 40, whereby to permit the lower shelf to be utilized for a wide variety of purposes, from baking rolls (requiring only slight spacing) to roasting turkeys (requiring great spacing because of the size of the birds), and yet affording a supplemental baking shelf except in the upper extremes of vertical adjustment of the shelf 40. The bearing 42 accommodates manual rotation and thus complete utilization of the top shelf 40 in the manner of a "lazy susan."

All four of the decks or shelves 32—33—34 and 40 are of an outer diameter closely approaching the inner diameter of the enclosure 10 to substantially fill the enclosure, but with freedom for rotary movement therein.

The oven is exhausted via a conventional flue opening 44 through the top wall 21, and to afford maximum utilization of available heat I prefer to suspend a water heating coil 45 from the oven ceiling to provide (or at least aid in providing) the hot water requirements of the restaurant in which the oven is installed.

Air and heat flow through the oven is naturally induced, there being no requirement according to the invention for any blowers, fans, supplemental air, or the like. The burners 36 provide for complete combustion of the fuel and afford a natural flow of heat and air upwardly through the baking space of the oven, over the coil 45 and out through the flue 44, fresh or makeup air being induced into the oven through the openings in the enclosure 10 and through the base 12.

At the front of the oven, as shown in FIGS. 1 and 2, a pair of horizontally elongate openings 52 and 53 are provided in the cylindrical wall 20 of the enclosure 10 at the level respectively of the broil decks 32 and 33. Each of the openings is closed by a set of circumferentially sequential doors, preferably three contiguous doors 52w, 52m, 52r and 53w, 53m, 53r, respectively closing the slotlike openings 52 and 53. Each door is preferably hinged to the wall 20 at its lower edge so as to be swung downwardly to open position.

At the side of the oven adjacent the doors 52w and 53w, the wall 20 is provided with a pair of discharge openings 62 and 63 at the level respectively of the decks 32 and 33 and the openings 52 and 53. Each of these openings is equipped with an outwardly radiating discharge shelf 62a and 63a, respectively, each preferably comprising a roller conveyor, i.e., a pair of sidewalls and a bottom surface formed by a plurality of spaced parallel rollers journaled in sidewalls and having a slight downward inclination in a radially outward direction. Within the oven, a discharge bar 64 (FIG. 3) extends from approximately the center of each of the broil decks to that edge of the respective discharge opening adjacent the slotlike opening 52 and 53.

In use the motor is operated to drive the shaft 28 and the cooking decks 32—33—34 in the clockwise direction as viewed in plan. Consequently, any item of food inserted in any of the doors 52w, 52m, 52r or 53w, 53m, 53r will be moved in an arcuate path from the respective door to the discharge or ejector bar 64. This bar is inclined relative to the direction of movement of the item of food so that the rotation of the broil deck causes the food to move along the bar, through the respective discharge opening 62 or 63 and onto the respective conveyor 62a or 63a whereupon the food gravitates to the outer end of conveyor from which it may conveniently be removed for service to the customer.

Due to the circumferential spacing of the doors 52w, 52m. 52r and 53w, 53m, 53r, the transit time of the food through the broiler will be varied depending upon the initial selection of the door, thereby to broil the food (such as a steak) to a "well done," "medium" or "rare" condition as ordered by the customer. Intermediate degrees of cooking, such as "medium well" or "medium rare" can be obtained by opening the respective door and placing the food on the deck either slightly upstream or slightly downstream from a position directly inwardly of the door.

The speed of deck rotation is controllable by the knob 35 to provide the precise degree of cooking desired by the chef.

In this oven, all foods, whether broiled or baked, are preferably place in special pie-shape pans or casseroles to facilitate their movement through the oven and to prevent dripping of fats and oils onto lower decks and especially onto burners 36. Consequently, the cooking is clean and flameless to produce optimumly prepared cooked foods of high purity and excellent taste.

As will therefore be appreciated, broiling is carried out entirely automatically without necessity for supervision by the chef, other than preadjustment of the flameless motor speed and preselection of the appropriate door for insertion of the food.

Baking is not carried out automatically in view of the wide variety of baking times required for various foods (as contrasted to the rather uniform broiling times for individual preproportioned servings of broiled foods). Consequently, access to the bake shelves 34 and 40 is provided simply by a side hinged door 65 in the upper portion of the oven wall 20.

Preferably, a portion of one of the bake shelves is used for preheating the casseroles or pans employed for the preparation of individual services of food.

Below the cooking decks, and preferably within the base 12, a crumb deck 70 is provided for catching bits and pieces of food inadvertently dropped or spilled from the cooking decks. Adjacent the front of the oven, a hole is formed in the deck and a crumb tray or drawer 71 is slidably mounted on the lower surface of the deck below said hole, A scraper or sweep arm 72 is secured to the shaft 28 immediately above the crumb deck, whereby the arm sweeps crumbs and food fragments from the shelf to said hole and into the tray as the shaft is rotated. The tray 71 has a front wall comprising part of the base skirt 24 and provided with a knob facilitating removal and emptying of the tray, whereby cleanliness of the oven is very easily maintained.

To accommodate access to the support bearing 27 and motor 26, for purposes of lubrication or other servicing, an access door 73 is provided in the base skirt 24 below the tray 71.

The oven thus provided by the invention is an extremely compact device, especially considering its food production capabilities. For example, almost all entrees, meat, fowl or fish, can be broiled in 1 to 10 minutes in the oven, and the oven will cook simultaneously a wide variety of foods, for example, fish, steak and chicken, without cross-blending of flavors or odors. Consequently, continual input of entrees to be cooked is facilitated, and will result in high product output. For example, the oven will broil 72 4-ounce hamburgers in 5 minutes, 48 8-ounce steaks, medium, in 6 minutes, 45 to 50 half chickens in 6 minutes, etc. Yet, the oven is only 36 inches in diameter and 78 inches in height.

The oven includes an electrically operated drive for the rotary shelves, but is devised for manual operation in the event of a power failure or the like. Also, the gas-fired burners are adapted to operate on natural gas or bottle gas, and to be switched rapidly and conveniently from one to the other, whereby cooking may proceed with great efficiency even during times of disaster.

While I have shown the described what I regard to be the preferred embodiment of my invention, it is to be appreciated that various changes, rearrangements and modifications may be made therein without departing from the scope of the invention, as defined by the appended claims.

I claim:

1. A rotary oven comprising a base, a generally cylindrical insulated enclosure on said base, a shaft extending upwardly from said base axially into said enclosure, a motor in said base for rotating said shaft, a plurality of circular broil decks mounted in vertically spaced relation on said shaft within said enclosure and each having frictional engagement with said shaft normally to be rotated thereby, a plurality of infrared burners mounted above each of said broil decks in circumferentially spaced relation to one another, a circular bake deck mounted on said shaft above the uppermost set of burners and having frictional connection with said shaft normally to be rotated thereby, another bake deck suspended from the top of said insulated enclosure including means for adjusting the vertical position of the same, a door in said enclosure communicating with said bake decks, horizontally elongate door means in said enclosure at the level of each of said broil decks, a discharge opening in said enclosure at the level of each of said door means, each discharge opening being spaced circumferentially from the respective door means in the direction of deck rotation, and a discharge bar extending from the downstream edge of each of said discharge openings to adjacent said shaft immediately above each of said broil decks.

2. The oven of claim 1 including a water heating coil above said another bake deck adjacent the top of said enclosure.

3. The oven of claim 1 including a crumb deck in said base below said broil decks, a sweeper on the upper surface of said crumb deck connected to said shaft for rotation thereby, a crumb tray on the lower surface of said crumb deck communicating with an opening in said crumb deck, and a door in said base accommodating access to and removal of said tray.

4. The oven of claim 1 including a discharge shelf communicating with each of said discharge openings and radiating from said enclosure, each said shelf comprising a roller conveyor.

5. The oven of claim 1 including variable speed control means for said motor.

6. The oven of claim 1 wherein each of said horizontally elongate door means comprises a circumferentially sequential set of doors.

7. The oven of claim 6 wherein each door means comprises three contiguous doors closing a common opening.

8. In a rotary oven having a generally cylindrical insulated enclosure, a shaft extending axially into said enclosure, means for rotating said shaft, and a plurality of circular cooking decks on said shaft rotatable within the enclosure; the improvement comprising an oven shelf independent of said shaft suspended from the ceiling of said enclosure and including means exteriorly of the enclosure for adjusting its vertical position within the enclosure.

9. In an oven as set forth in claim 8, means rotatably suspending said oven shelf from said ceiling for accommodating manual rotation thereof.

10. In a rotary oven having a generally cylindrical insulated enclosure, a shaft extending axially into said enclosure, means for rotating said shaft, and a plurality of circular cooking decks on said shaft rotatably within the enclosure; the improvement comprising a crumb deck below the cooking decks, an opening in said crumb deck, a cleanout tray below said opening, a sweeper on said crumb deck connected to said shaft for sweeping crumbs from the deck into said tray, and means accommodating access to and removal of said tray.